United States Patent [19]
Curtis et al.

[11] Patent Number: 6,000,016
[45] Date of Patent: *Dec. 7, 1999

[54] MULTIPORTED BYPASS CACHE IN A BYPASS NETWORK

[75] Inventors: Steve Curtis, Forest Grove; Robert J. Murray; Helen Opie, both of Portland, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/850,686

[22] Filed: May 2, 1997

[51] Int. Cl.[6] ................................................ G06F 12/00
[52] U.S. Cl. ........................ 711/138; 395/280; 395/376; 395/800.01; 365/230.05; 365/233; 365/189.07; 365/189.05; 711/118; 711/117; 711/131
[58] Field of Search ...................... 365/230.05, 230.01, 365/233, 189.07, 189.05; 395/376, 800.01; 711/138, 118, 131, 117

[56] References Cited

U.S. PATENT DOCUMENTS

| | | | |
|---|---|---|---|
| 5,155,816 | 10/1992 | Kohn | 395/375 |
| 5,333,296 | 7/1994 | Bouchard et al. | |
| 5,404,482 | 4/1995 | Stamm et al. | |
| 5,404,552 | 4/1995 | Ikenaga | 395/800 |
| 5,454,094 | 9/1995 | Montove | |
| 5,459,852 | 10/1995 | Nakagawa et al. | |
| 5,542,058 | 7/1996 | Brown, III et al. | |
| 5,544,342 | 8/1996 | Dean | 395/446 |
| 5,557,768 | 9/1996 | Braceras et al. | |
| 5,752,069 | 5/1998 | Roberts et al. | 395/800.23 |

OTHER PUBLICATIONS

David A Patterson, John L. Hennessy; "Computer Architecture A Quantitative Approach", 2nd Edition 1996 by Morgan Kaufmann Publishers, Inc., pp. 144–161.

*Primary Examiner*—Ayaz R. Sheikh
*Assistant Examiner*—Frantz Blanchard Jean
*Attorney, Agent, or Firm*—Alan K. Aldous

[57] ABSTRACT

A microprocessor includes a register file that contains registers for storing pieces of data for use by execution units that receive the pieces of data through source ports. A bypass cache includes data registers into which pieces of data from the execution units are written. Data can be written to and read from the bypass cache in fewer clocks cycles than it can be written to and read from the register file. A content addressable memory array (CAM) includes address registers into which destination addresses are written which correspond to the pieces of data in the data registers. In the case of a particular piece of data, the particular data register into which the piece of data is written and the particular address register into which the corresponding destination address is written is controlled by the position of a write pointer provided by a rotating write pointer unit. The CAM includes a comparators that compare the destination address with a source address. If there is a match, a read port is enabled which provides the piece of data in the corresponding data register to conductors leading to the source port. Multiplexers select between pieces of data in the register file and a pieces of data in the data registers of the bypass cache.

21 Claims, 7 Drawing Sheets

MULTIPORTED BYPASS CACHE IN A BYPASS NETWORK

BACKGROUND OF THE INVENTION

1. Technical Field of the Invention

The present invention relates to bypass networks in microprocessors and, more particularly, to bypass networks including multiported bypass caches.

2. Description of Prior Art

In a superscaled microprocessor, pieces of data are stored in a register file to be available for use by execution units which are associated with pipelines. It can take four or more clock cycles for a piece of data produced by an execution unit to be written to the register file and then read from the register file to be available for the same or another execution unit. The delay in the availability of the data is referred to as latency. However, the same or another execution unit may need the piece of data before it is available, perhaps even at the very next cycle. If the required piece of data is not available, the execution unit may be idle or otherwise inefficiently used while waiting for the piece of data. The problem is exasperated by an increased number of pipeline stages associated with increased clock frequencies and sizes of internal memory.

As a partial solution to the problem, bypass networks have been employed to hold the piece of data for several clock cycles. The contents of the bypass network is more immediately available to the execution unit than is the contents of the register file, thereby reducing waiting by the execution unit. For example, referring to FIG. 1, a prior art bypass unit 10 includes an array of shift register data latches DL1, DL2, DL3, and DL4 that receive pieces of data from an execution unit. There are corresponding shift register address latches AL1, AL2, AL3, and AL4. Each piece of data is assigned an address in the register file. The address in address latch AL1 is the address assigned to the data in data latch DL1. Likewise, the addresses in address latches AL2, AL3, and AL4 are the addresses assigned to the data in data latches DL2, DL3, and DL4, respectively. The addresses in address latches AL1, AL2, AL3, and AL4 are referred to as destination addresses.

Just prior to a piece of data being written into data latch DL1, the data in DL3 is shifted into DL4, the data in DL2 is shifted into DL3, and the data in DL1 is shifted into DL2. Likewise, the address in AL3 is shifted into AL4, the address in AL2 is shifted into AL3, and the address in AL1 is shifted into AL2. The address assigned to the data written into DL1 is written into AL1. Shifting (from AL3 to AL4, AL2 to AL3, and AL1 to AL2) may occur with each clock cycle.

The pieces of data in data latches DL1, DL2, DL3, and DL4 are selectively supplied to a multiplexer (MUX) 14 through a group of conductors 16, 18, 20, and 22. It will be appreciated that each of conductors 16, 18, 20, and 22 comprises numerous parallel conductors. The particular piece of data that is passed by MUX 14 to conductors 26 is controlled by the state of signals on conductors 30, 32, 34, and 36. The state of the signals on conductors 30, 32, 34, and 36 is controlled by comparators 40, 42, 44, and 46.

For example, assume that a piece of data X is contained in data latch DL2 and that data X is assigned an address 000110. Accordingly, 000110 will be stored in address latch AL2. Because each piece of data is assigned a different address in the register file, address latches AL1, AL3, and AL4 will not contain 000110. If the microprocessor scheduler determines that data X is to be provided to conductors 26, the value 000110 is written as a source address to a conductor 48. The value 000110 is passed to each of comparators 40, 42, 44, and 46, where it is compared with the addresses in address latches AL1, AL2, AL3, and AL4, respectively. Because the contents of address latch AL2 matches the value on conductor 48, a signal on conductor 32 is asserted, while the states of conductors 30, 34, and 36 remain deasserted. Accordingly, MUX 14 passes data X from data latch DL2 on conductors 18 to conductors 26.

There are, however, significant problems with the use of bypass units such as bypass unit 10. First, with each clock cycle, data and addresses are shifted. Over time, this consumes an appreciable amount of power.

Second, such bypass units take up a relatively large amount of microprocessor real estate. The fan-in on MUX 14 is at least as great as the product of the number of data latches and the number of bits per piece of data. Typically, the number of data latches in a bypass unit is at least equal to the number of cycles of the write-read latency. Further, bypass unit 10 holds pieces of data for only a single execution unit. The total real estate increases with the number of execution units.

Accordingly, there is a need for a bypass network that efficiently uses power and microprocessor real estate, yet provides execution units with ready access to pieces of data.

SUMMARY OF THE INVENTION

The present invention involves a computer comprising execution units including source ports. Groups of conductors are each connected to one of the source ports. A bypass network includes a bypass cache and a content addressable memory array (CAM). The bypass cache includes data registers to store pieces of data from one of the execution units. The bypass cache also includes read ports each when activated providing the piece of data in a corresponding one of the data registers to a corresponding one of the groups of conductors. The CAM receives destination addresses of the pieces of data and source addresses of desired pieces of data, and when there is a match between one of the source addresses and one of the destination addresses, the CAM provides a signal to activate a corresponding one of the read ports.

BRIEF DESCRIPTION OF THE DRAWINGS

The invention will be understood more fully from the detailed description given below and from the accompanying drawings of embodiments of the invention, which, however, should not be taken to limit the invention to the specific embodiments described, but are for explanation an understanding only.

DETAILED DESCRIPTION OF PREFERRED EMBODIMENTS

The present invention relates to a bypass network having one or more multiported bypass caches. In the following description, numerous specific details are set forth regarding a preferred illustrated embodiment of the invention. However, it will be appreciated that the invention may be implemented and practiced without these or with different specific details.

Figure 1:
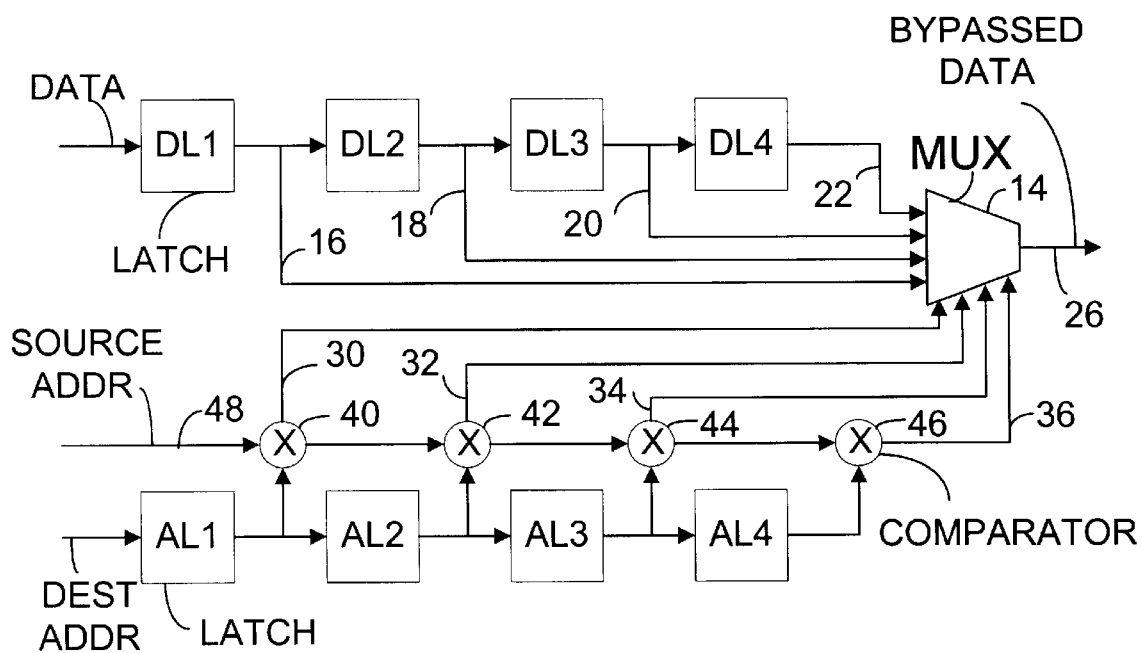
FIG. 1 is a schematic block diagram representation of a prior art bypass unit.
Figure 2:
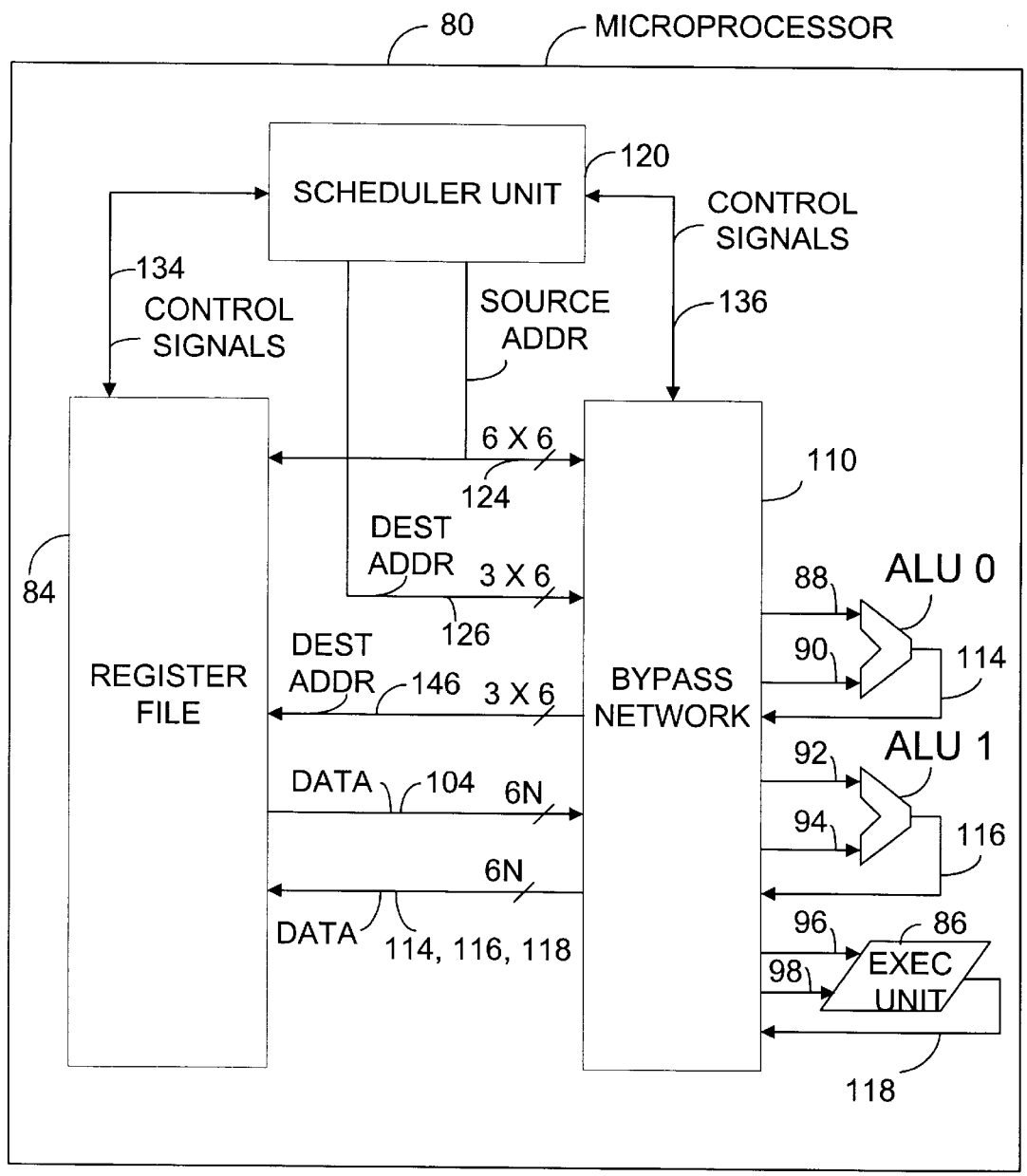
FIG. 2 is a schematic block diagram representation showing interconnections between a bypass network according to a preferred embodiment of the present invention and a register file, scheduler unit, and execution units in a microprocessor.

Referring to FIG. 2, a microprocessor 80 includes a register file 84 that contains registers holding data for use by execution units. Arithmetic logic unit (ALU) 0 and ALU 1 are examples of execution units. An execution unit 86 may be an ALU or some other form of execution unit. Merely as an example, register file 84 may have 64 registers of 38 bits each. The 38 bits may hold 32 bits of data and 6 flag bits. For convenience, the entire 38 bits may be referred to as data. The term data is used broadly in the present description. In that $2^6=64$, 6 bits may uniquely identify each of the 64 registers. Execution unit ALU 0 receives data from source ports 88 and 90. Execution unit ALU 1 receives data from source ports 92 and 94. Execution unit 86 receives data from source ports 96 and 98. Accordingly, there are six source ports in the illustrated embodiment. From the perspective of a scheduler unit 120, there is a dispatch port associated with each of execution units ALU 0, ALU 1, and 86.

Execution units ALU 0, ALU 1, and 86 include outputs connected to conductors 114, 116, and 118, respectively, on which the results of operations are provided. A bypass network 110 is a simple and compact bypass network that consumes relatively little power and provides ready access to data for multiple execution units. Bypass network 110 holds the results (also referred to as data) provided by execution units ALU 0, ALU 1, and 86 to conductors 114, 116, and 118. In a preferred embodiment, a piece of data can be stored from the output of an execution unit to a register in bypass network 110 and read from the register in bypass network 110 to be made available to the same or another execution unit in one clock cycle. (Delaying the read stage from the beginning of the write stage may be used to accomplish these in one cycle.) The data that is stored in bypass network 110 is also stored in register file 84, although it takes one or more extra clock cycles to complete storage of the data in register file 84.

Scheduler unit 120 directs which pieces of data from register file 84 and/or bypass network 110 should be provided at given times to execution units ALU 0, ALU 1, and 86. Pieces of data from register file 84 are provided by conductors 104 to source ports 88, 90, 92, 94, 96, and 98 (if selected by associated multiplexers). Conductors 104 may simultaneously carry six pieces of N bit wide data. Scheduler unit 120 provides source addresses over conductors 124 to register file 84 and bypass network 110. Scheduler unit 120 provides six source addresses per cycle, one for each source port 88, 90, 92, 94, 96, and 98. Scheduler unit 120 also provides three destination addresses per cycle over conductors 126 to bypass network 110. Bypass network 110 passes the destination addresses to register file 84 over conductors 146.

Conductors 134 and 136 provide control signals to register file 84 and bypass network 110. Details regarding the control signals and implementing circuitry are not provided because they are well known to those skilled in the art and, if provided, would greatly clutter up the drawings and obscure the invention. Moreover, there is more than one way to implement such control signals and circuitry. Further, various other internal signals and implementing circuitry, such as read and write circuitry, are not illustrated for the same reasons. For any structure described or illustrated in this disclosure, any of various well known means of design and fabrication may be employed.

Figure 3:
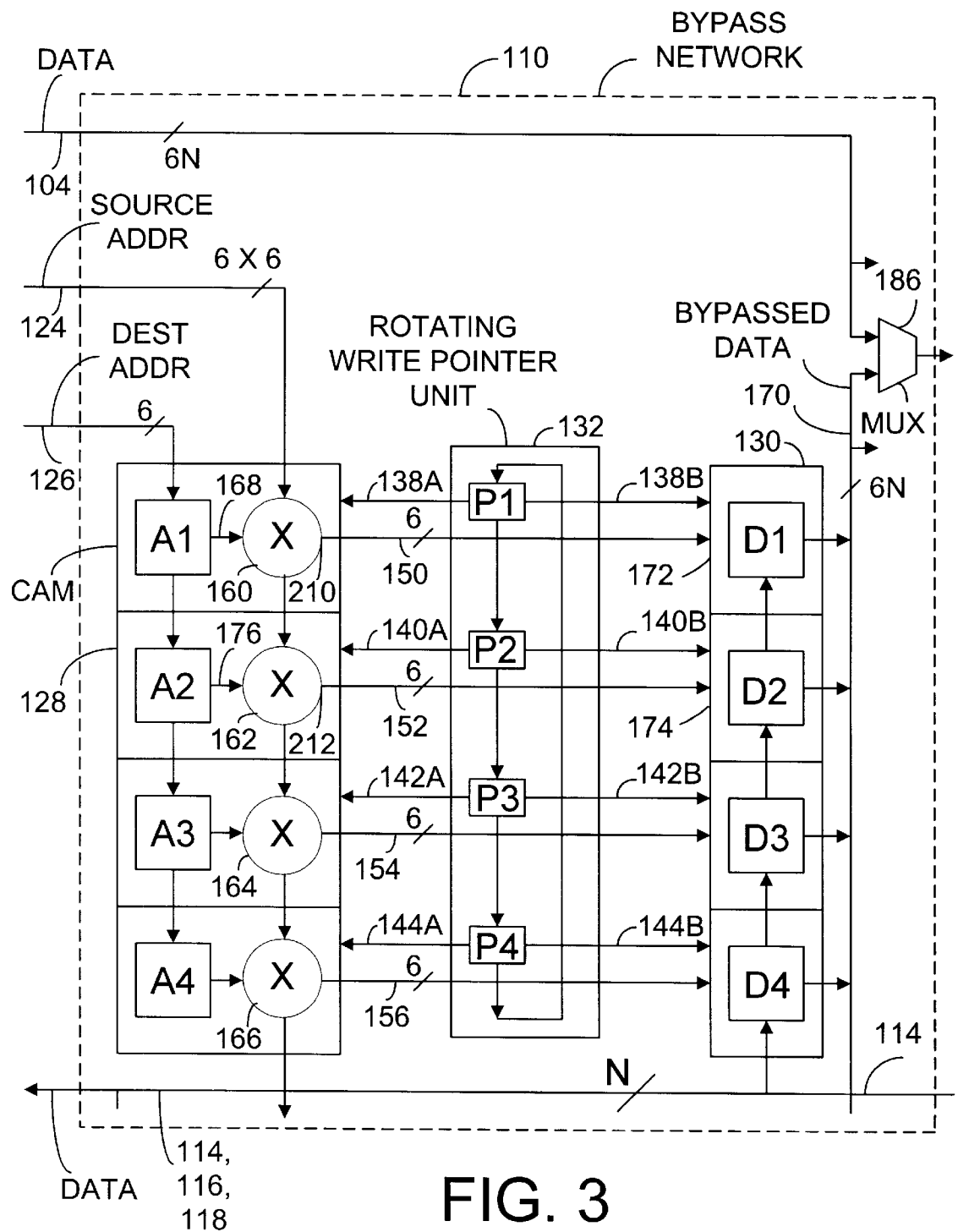
FIG. 3 is a block diagram representation of a portion of the bypass network of FIG. 1.
Figure 4:
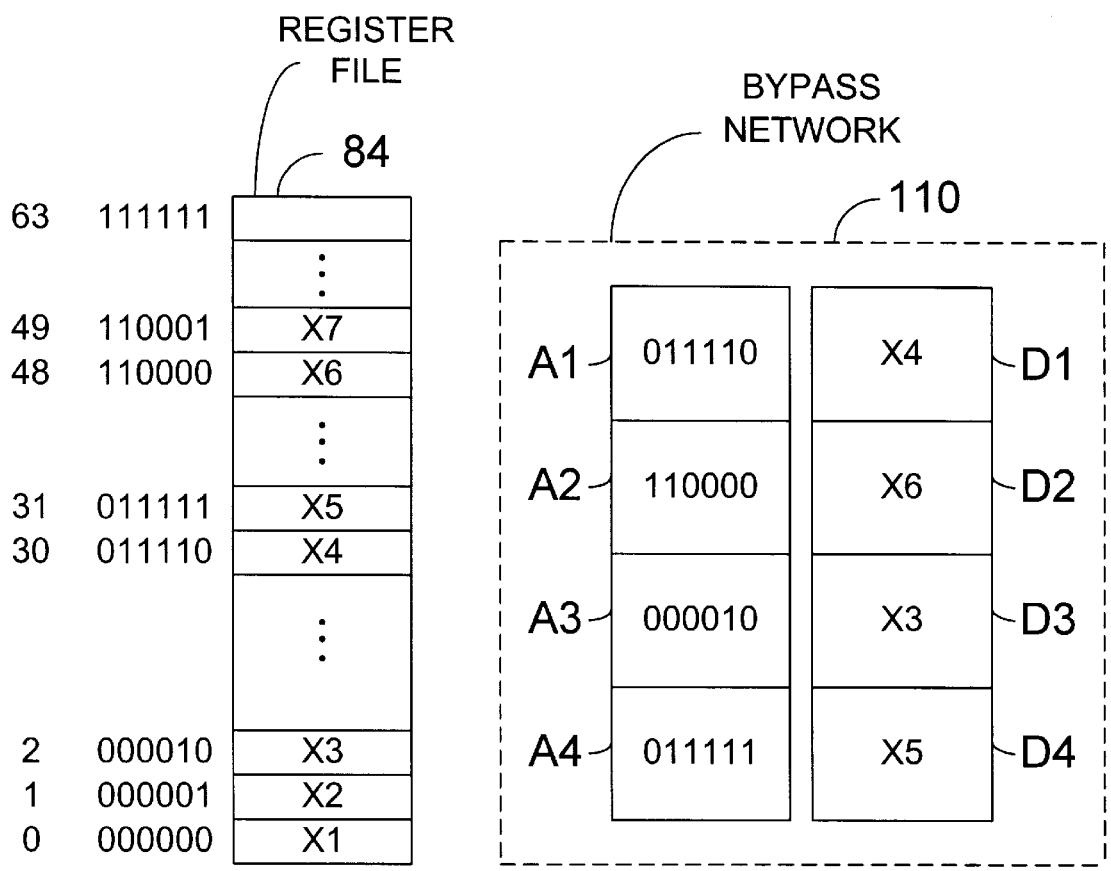
FIG. 4 is a graphical representation of certain registers in the register file and bypass network of FIG. 1.

Referring to FIGS. 2-6, source and destination addresses are used as follows. Each register in register file 84 is assigned an address (e.g., 0–63). When a piece of data is to be written into register file 84, scheduler 120 assigns a particular register for the piece of data to be written into. From another perspective, scheduler 120 assigns an address for the piece of data. If the piece of data is also written into bypass network 110, the same address is associated with the data in both register file 84 and bypass network 110. (In some cases, data may be created from an execution unit and assigned an address shortly before or after it is created at the execution unit.) FIG. 4 illustrates registers in register file 84 including six bit binary addresses and corresponding decimal values. Representative data X1, X2, X3, X4, X5, X6, and X7 (each of which may be 38 bits wide) are stored in selected registers of register file 84. For example, a piece of data X4 is written into register 011110 (30 decimal) and a piece of data X6 is written into register 110000 (48 decimal). From another perspective, data X4 is assigned address 011110 and data X6 is assigned address 110000.

Figure 6:
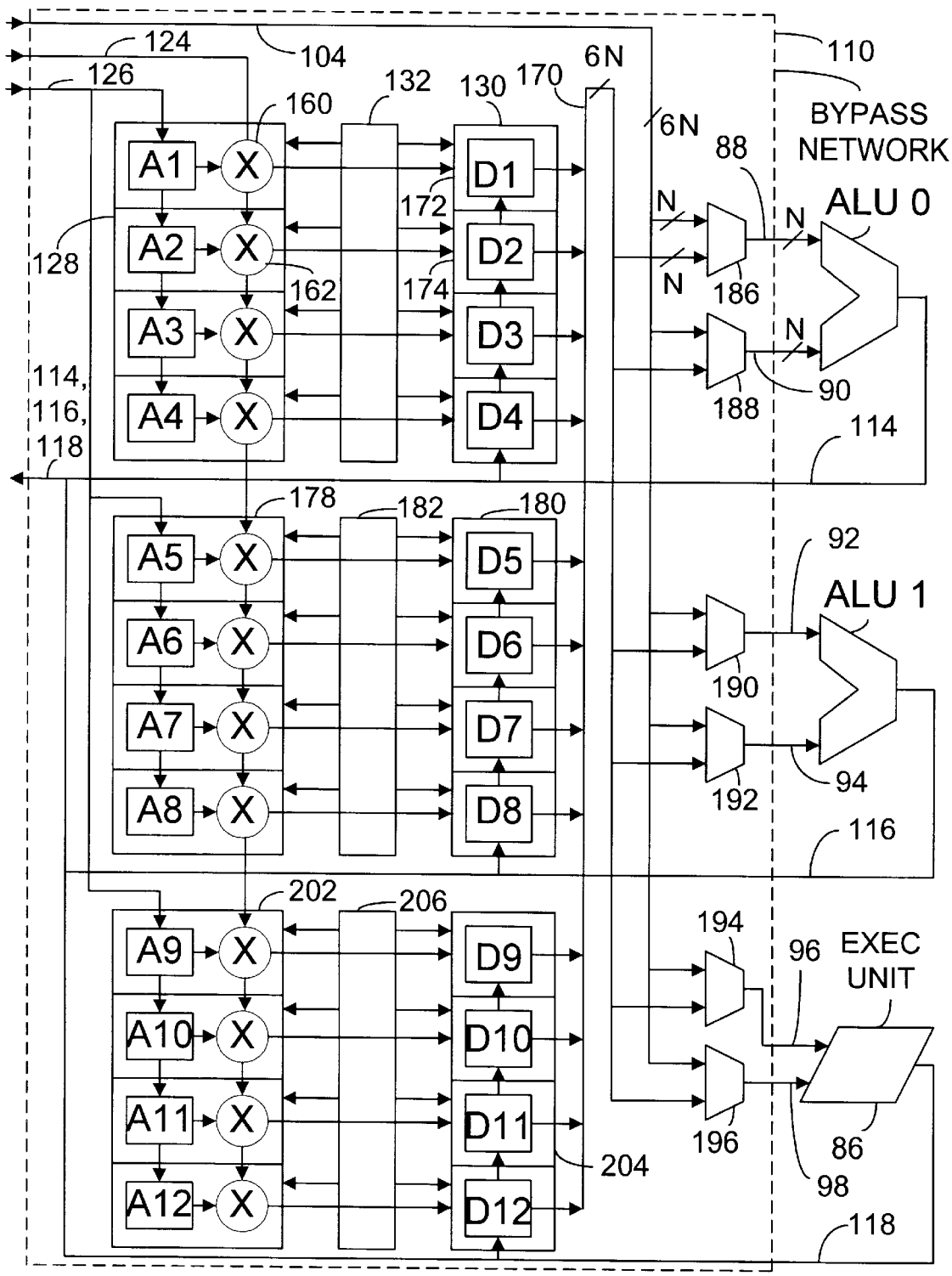
FIG. 6 is a block diagram representation of a more complete portion of the bypass network of FIG. 1.

Referring to FIGS. 3 and 6, bypass network 110 includes a content addressable memory array (CAM) 128, a multiported associative bypass cache 130, and a rotating write pointer unit 132. As shown in FIG. 6, bypass network 110 also includes CAMs 178 and 202, which are the same as CAM 128; multiported bypass caches 180 and 204, which are the same as bypass cache 130; and rotating write pointer units 182 and 206, which are the same as rotating write pointer unit 132. CAM 128 includes registers A1, A2, A3, and A4, CAM 178 includes address registers A5, A6, A7, and A8, and CAM 202 includes address registers A9, A10, A11, and A12. Bypass cache 130 includes data registers D1, D2, D3, and D4, bypass cache 180 includes data registers D5, D6, D7, and D8, and bypass cache 204 includes data registers D9, D10, D11, and D12. CAM 128 and bypass cache 130 form a fully associative cache. CAM 178 and bypass cache 180 form a fully associative cache. CAM 202 and bypass cache 204 form a fully associative cache.

Referring to FIGS. 2, 3, and 6, pieces of data from conductors 114 are written into data registers D1, D2, D3, and D4. Address registers A1, A2, A3, and A4 hold six-bit destination addresses from conductors 126 that correspond to the data stored in data registers D1, D2, D3, and D4, respectively. For any given piece of data on conductors 114, the particular one of data registers D1, D2, D3, and D4 into which the data is written and the particular one of address registers A1, A2, A3, and A4 into which the corresponding destination address is written depends on the position of a write pointer in rotating write pointer unit 132.

Rotating write pointer unit 132 includes registers P1, P2, P3, and P4 which are four positions that may hold a write pointer. The write pointer is at one of the four positions. After each write, the write pointer is shifted to the next register. For example, if the write pointer is at register P3, following a write, the write pointer will shift to register P4. Following the next write, the write pointer will shift to register P1, and so forth. Conductors 138A and 138B are activated when the write pointer is at register P1. Conductors 140A and 140B are activated when the pointer is at register P2. Conductors 142A and 142B are activated when the write pointer is at register P3. Conductors 144A and 144B are activated when the write pointer is at register P4.

FIG. 4 illustrates relationships between destination addresses of and data in register file 84 and destination addresses and data in bypass network 110. Referring to FIGS. 3 and 4, data X4 is assigned the destination address 011110. Accordingly, data X4 is stored in address 011110 in register file 84. At the time data X4 is to be written into bypass cache 130, the write pointer of rotating write pointer unit 132 is pointing at address register A1 and data register D1. Accordingly, 011110 is written into address register A1, and data X4 is written into data register D1. In the next write cycle, address 110000 is written into address register A2 and data X6 is written into data register D2. In register file 84, data X6 is stored in register 110000. Note that depending on the circumstances, because of a time lag, FIG. 4 may not be a snap shot in time.

Referring to FIG. 6, data from execution unit ALU 1 is provided on conductors 116 to data registers D5, D6, D7, and D8, and to register file 84. Corresponding destination addresses are provided through conductors 126 to address registers A5, A6, A7, and A8. However, the particular address register and particular data register into which a destination address and piece of data are written depends on the position of a write pointer in rotating write pointer unit 182 at the time of writing.

Data from execution unit 86 is provided on conductors 118 to data registers D9, D10, D11, and D12, and to register file 84. Corresponding destination addresses are provided through conductors 126 to address registers A9, A10, A11, and A12. However, the particular address register and particular data register into which a destination address and piece of data are written depends on the position of a write pointer in rotating write pointer unit 206 at the time of writing.

Addresses remain in the address registers and data remains in data registers in bypass network 110 until they are written over. In the embodiment of FIGS. 3 and 6, data is written over every fourth write. If there were five address registers per CAM, five pointer positions per rotating write pointer unit, and five data registers per bypass cache, an address and a piece of data would be written over every fifth write.

In the embodiment of FIGS. 2–6, the position of a write pointer is shifted rather than the addresses in the address registers and the data in the data registers being shifted. For example, an address stored in address register A1, remains in address register A1 until it is written over when the write pointer returns to position P1 after four write operations. The cumulative effect of not shifting provides a significant reduction in clock loading and power consumption.

Figure 5:
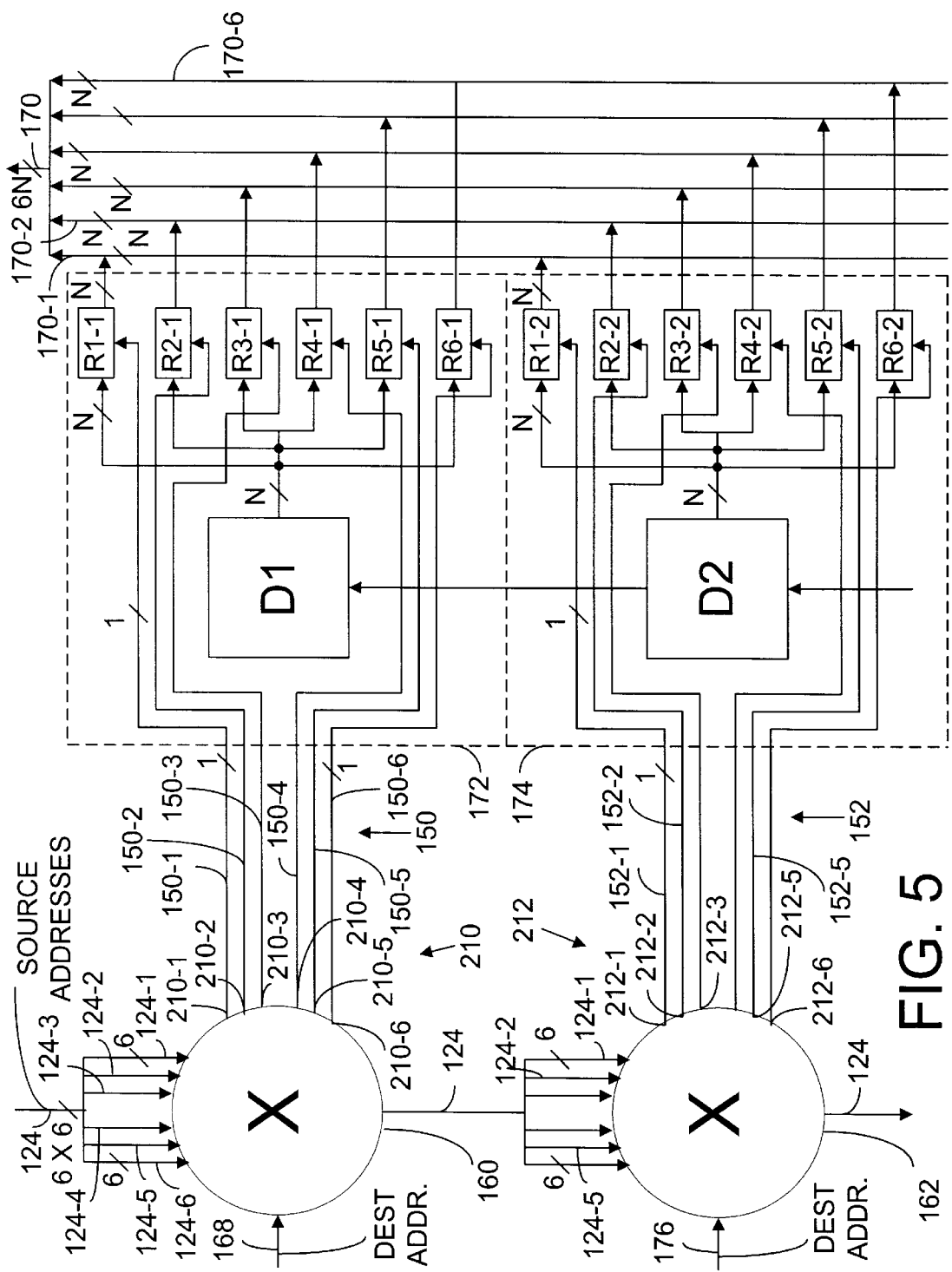
FIG. 5 is a more detailed block diagram representation of comparators and sections of bypass caches of FIG. 3.

Referring to FIGS. 3 and 5, comparators 160, 162, 164, and 166 of CAM 128 each receive six source addresses on six groups of conductors (i.e., conductors 124-1, 124-2, 124-3, 124-4, 124-5, and 124-6) of conductors 124. Four comparators in CAM 178 and four comparators in CAM 202 also receive the same six source addresses on conductors 124. The comparator may be static or dynamic. There may be up to six different source addresses on conductors 124, in any combination. Two or more of the groups of conductors could conduct the same source address. For example, conductors 124-1 and conductors 124-3 could each conduct source address 011110. In such a case, there will be less than six different source addresses on conductors 124.

Comparators 160, 162, 164, and 166 also receive the destination addresses in address registers A1, A2, A3, and A4, respectively. As illustrated in FIG. 5, comparator 160 receives the six source addresses on conductors 124-1, 124-2, 124-3, 124-4, 124-5, and 124-6. Comparator 162 also receives the same six source addresses on conductors 124-1, 124-2, 124-3, 124-4, 124-5, and 124-6. (Comparator 160 may be considered six comparators.) Destination addresses are provided to comparators 160 and 162 from registers A1 and A2 through conductors 168 and 176, respectively. If a source address on one of conductors 124 matches the destination address in address register A1, a signal (which may be called a pointer) is asserted at a corresponding one of outputs 210-1, 210-2, 210-3, 210-4, 210-5, and 210-6 which form outputs 210 of comparator 160. Outputs 210-1, 210-2, 210-3, 210-4, 210-5, and 210-6 are connected to conductors 150-1, 150-2, 150-3, 150-4, 150-5, or 150-6, respectively, which form conductors 150. For example, if the source address on conductors 124-1 is 011110, it matches the contents of address register A1 (see FIG. 4), and a signal from output 210-1 is asserted on conductor 150-1. Likewise, if the source address on conductors 124-3 is 011110, it also matches the contents of address register A1, and a signal from output 210-3 is asserted on conductor 150-3. The other comparators are the same as comparator 160. For example, comparator 162 includes outputs 212. If conductors 124-5 includes source address 110000, then a signal from output 212-5 will be asserted on conductor 152-5 because address register A2 contains 110000. Signals on individual ones of conductors 154 and 156 are asserted if there is a match in comparators 164 or 166.

Rotating write pointers 132, 182, and 206 produce fully decoded write address. The comparators in CAMS 128, 178, and 202 produce fully decoded read addresses.

FIG. 5 illustrates details of cache sections 172 and 174 of bypass cache 130 of FIG. 3. As illustrated in FIG. 5, a cache section 172 includes read ports R1-1, R2-1, R3-1, R4-1, R5-1, and R6-1. Read port R1-1 is activated (i.e., passes data from data register D1 to conductors 170-1) when a signal on conductor 150-1 is asserted. Read port R2-1 is activated when a signal on conductor 150-2 is asserted, and so forth. A cache section 174 includes read ports R1-2, R2-2, R3-2, R4-2, R5-2, and R6-2. Read port R1-2 is activated when a signal on conductor 152-1 is asserted. Read port R2-2 is activated when a signal on conductor 152-2 is asserted, and so forth. There is a set of six read ports R1, R2, R3, R4, R5, and R6 for each of the twelve data registers D1–D12. Read ports R1-1 and R1-2 are examples of two of the twelve read ports R1. Read ports R2-1 and R2-2 are examples of two of the twelve read ports R2. There are, therefore, 72 read ports in the example of FIGS. 2–6.

If activated, a read port passes data from the data register to one of the groups of conductors 170. For example, the groups of conductors 170 include conductors 170-1, 170-2, 170-3, 170-4, 170-5, and 170-6 (each being N bits wide, where N may be 38). For example, if read port R1-1 is activated, the data in data register D1 is passed to conductors 170-1. If read port R3-1 is activated, the data in register D1 is also passed to conductors 170-3. There is a read port between each data register and each source port. Accordingly, there are six read ports (R1, R2, R3, R4, R5, and R6) between each data register (e.g., D1, D2, . . . , D12) and one of source ports 88, 90, 92, 94, 96, and 98.

There are six groups of twelve read ports that are wire ORed to a respective one of the six groups of conductors 170-1, 170-2, 170-3, 170-4, 170-5, and 170-6. One of the twelve read ports from each of the six groups is connected between one of the twelve data registers and one of the groups of conductors 170-1, 170-2, 170-3, 170-4, 170-5, and 170-6. For example, a first group of twelve read ports R1 (including R1-1 and R1-2 shown in FIG. 5) are connected to conductors 170-1 in a wire ORed arrangement. A second group of twelve read ports R2 (including R2-1, R2-2 shown in FIG. 5) are connected to conductors 170-2 in a wire ORed arrangement. Likewise, a third, fourth, fifth, and sixth group of twelve read ports are connected to conductors 170-3, 170-4, 1705, and 170-6, respectively, in wire ORed arrangements. Because every piece of data is assigned a unique destination address, there will not be more than one of address registers A1–A12 with the same destination address. Accordingly, no more than one of the twelve read ports in a group with be activated at a time. Therefore, there is no contention on any of conductors 170-1, 170-2, 170-3, 170-4, 170-5, and 170-6. Data from any of data registers D1–D12 may be supplied to any of the six source ports 88–98.

Referring to FIGS. 2, 5, and 6, MUXs 186, 188, 190, 192, 194, and 196 are positioned between conductors 170-1, 170-2, 170-3, 170-4, 170-5, and 170-6 (which form conductors 170) and source ports 88, 90, 92, 94, 96, and 98, respectively. Conductors 104 include six groups of conductors to carry six N bit wide data signals. MUXs 186–196 pass either the data signal from one of the groups of conductors 104 or from one of the groups of conductors 170. If there is a match between the source address on a particular group of conductors 124 and a destination address stored in an address register in a CAM, the corresponding one of MUXs 186–196 passes the data from the corresponding data register over the corresponding one of conductors 170. Otherwise, the MUX passes the data from the corresponding group of conductors of conductors 104 from register file 84. For example, if the source address on conductors 124-2 does not match any of the destination addresses in the address registers A1–A12, MUX 188 passes data from the corresponding conductors of conductors 104 rather than from conductors 170-2.

The following chart summarizes the relationship between conductors 170, source ports, MUXs, and execution units.

| Conductors | Source Port | Execution Unit |
|---|---|---|
| 170-1 | 88 (if selected by MUX 186) | ALU 0 |
| 170-2 | 90 (if selected by MUX 188) | ALU 0 |
| 170-3 | 92 (if selected by MUX 190) | ALU 1 |
| 170-4 | 94 (if selected by MUX 192) | ALU 1 |
| 170-5 | 96 (if selected by MUX 194) | 86 |
| 170-6 | 98 (if selected by MUX 196) | 86 |

Additional Information and Embodiments

The following provides additional information regarding the above-recited embodiment of FIGS. 2–6 and information regarding alternative embodiments of the invention. In any event, it is the claims that determine the scope of coverage, not the specific details recited herein.

The borders of the boxes in the figures are for illustrative purposes. An actual device would not have to include such defined boundaries. The relative size of the illustrative components is made for ease of illustration, not to suggest actual relative sizes.

It is not required that each execution unit process data of the same bit width. For example, one execution unit may act on 32 bit data while another execution unit may act on 64 bit data or 128 bit data. The data may be added by the execution unit in stages or stored and acted on in the full width. There does not have to be the same number of read ports for each data register.

The CAMs and bypass caches may have an arbitrary depth (i.e., number of address registers and data registers). Accordingly, the number of address registers and data registers is not limited to four, as is illustrated in the embodiment of FIGS. 3 and 6. The number of address registers and data registers is preferably at least as great as the latency (the number of stages in the loop or cycles to be bypassed). That way, data will not be overriden before it is needed. The address and data registers are preferably random access memory (RAM) type cells. Further, there may be more or less than three execution units.

In a microprocessor, there are, of course, numerous components that are not illustrated in the figures or described herein. The present invention is, however, not limited to use in a microprocessor, but may be used in other computers, such as a microcontroller or dedicated hardware that does not use software or firmware. The present invention may or may not be used in connection with out of order execution and register renaming.

The present invention does not require the use of a rotating write pointer. Rather, another write pointer unit may be used. Various allocation policies could be used. For example, a least recently used (LRU) or pseudo LRU policy could be used. Data can be kept for longer than the latency period.

Figure 7:
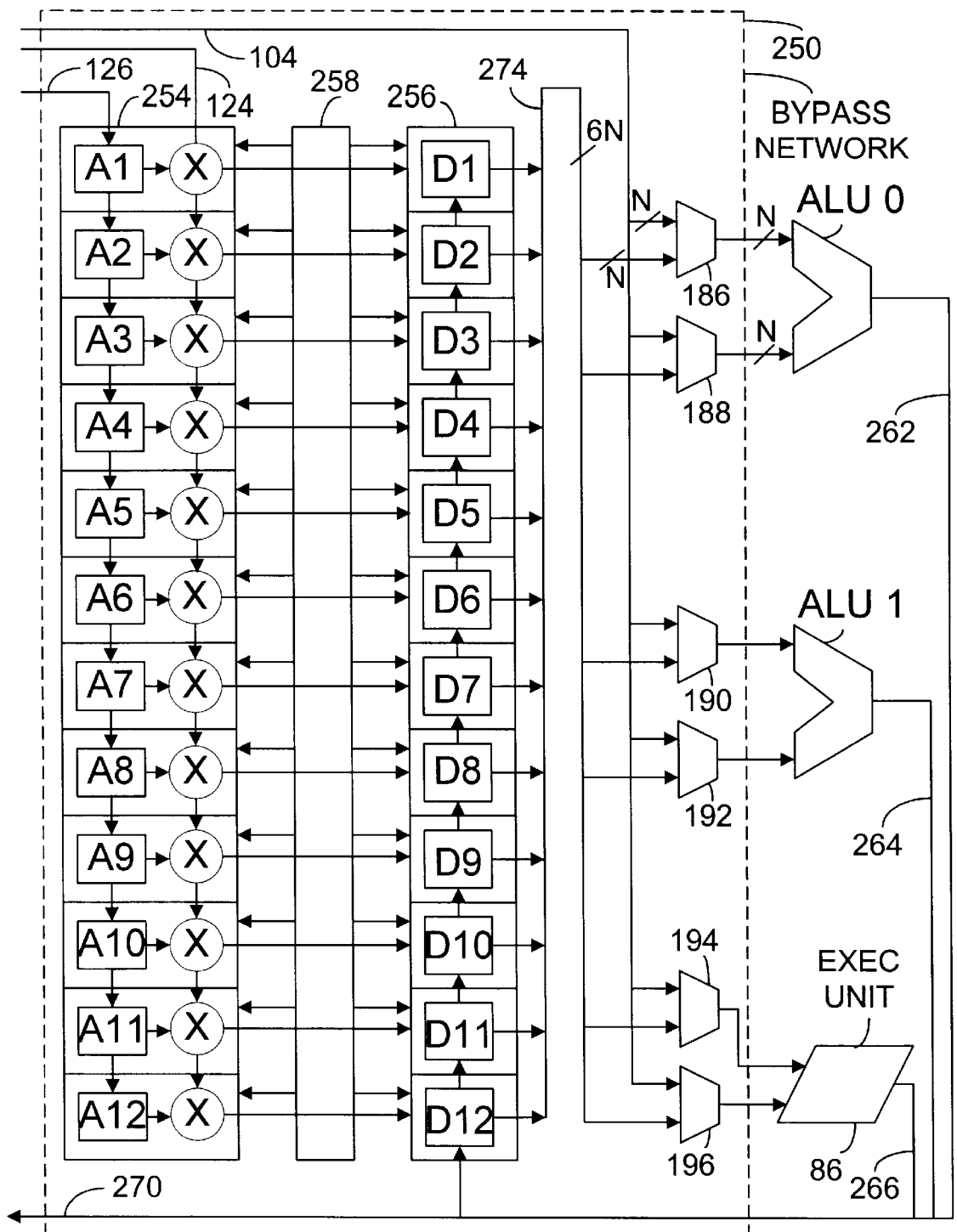
FIG. 7 is a block diagram representation of an alternative embodiment of a bypass network.

FIG. 7 illustrates a bypass network 250, which is an alternative embodiment of a bypass network to that of bypass network 110. Referring to FIG. 7, bypass network 250 includes a CAM 254 that includes address registers A1–A12 and a bypass cache 256 that contains data registers D1–D12. Data registers D1–D12 may receive data from any one execution units ALU 0, ALU 1, and 86 through conductors 262, 264, and 266. Data is also provided on conductors 270 to register file 84. Corresponding destination addresses are provided to address registers A1–A12 through conductors 126. The particular data register and address register that a particular piece of data and a corresponding destination address are written into is controlled by the position of a write pointer in rotating write pointer unit 258. In bypass network 110, data from execution unit ALU 0 is written only to data registers D1–D4. Likewise, data from execution unit ALU 1 is written only to data registers D5–D9, etc. By contrast, in bypass network 250, data from any of the execution units ALU 0, ALU 1, and 86 may be written to any of the data registers D1–D12. A corresponding addresses is written to any of the address registers. Data read from data registers D1–D12 is provided through conductors 274 to execution units ALU 0, ALU 1, and 86. Bypass network 250 may use any of various allocation polices (e.g., LRU or pseudo LRU, two name only two).

In contrast to FIGS. 6 and 7, a single CAM and a single bypass cache could be used in connection with a single execution unit.

Preferably, destination addresses are synchronously written to an address register in each of CAMs 128, 178, and 202, data are synchronously written to a data register in each of bypass caches 130, 180, and 204, and data is synchronously read from data registers in each of bypass caches 130, 180, and 204. For example, the time at which data is written into a data register of bypass cache 130 may be synchronous with the time data is written to bypass cache 180. Alternatively, the writing and reading may be asynchronous. For example, the time at which data is written into or read from a data register of bypass cache 130 may be independent of the time data is written into or read from a data register of bypass cache 180.

Although it is strongly preferred that a bypass network be able to write a piece of data into a register and read the piece of data from the register to be available to any execution unit within one clock cycle, it is not required in every embodiment of the invention.

There may be intermediate structure (such as a buffer) or signals that are between two illustrated structures. Some conductors may not be continuous as illustrated, but rather be broken up by intermediate structure.

The destination address may be provided to register file 84 directly from scheduler unit 120 rather than from bypass network 110 or 250. The six groups of N-bit wide data may be multiplexed onto a single N bit wide set of conductors prior to leaving bypass network 110. Although parallel conduction of data is preferred, in a particular case, that could be replaced with serial conduction.

Rotating write pointers 132, 182, and 206 are not required to produce fully decoded write addresses. The comparators in CAMS 128, 178, and 202 are not required to produce fully decoded read addresses. Bypass caches 130, 180, and 204 are not required to be fully associative.

The outputs of comparators 160, 162, etc. may have receive signal conductors (as in FIG. 5) or multiple conductors. That is, there could be more than one conductor between each output and each read port. Comparator 160 is preferably, but not necessarily, six comparators (to match six source ports).

The term "connected" and related terms are used in an operation sense and are not necessarily limited to a direct connection. For example, data registers are connected to source ports, although indirectly through conductors and MUXs.

If the specification states a component "may", "could", or is "preferred" to be included, that particular component is not required to be included.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A computer comprising:
   execution units including source ports;
   groups of conductors, each group being connected to one of the source ports; and
   a bypass network including:
      a multiported bypass cache including data registers to store pieces of data from one of the execution units, and read ports each when activated providing the piece of data in a corresponding one of the data registers to a corresponding one of the groups of conductors; and
      a content addressable memory array (CAM) to receive destination addresses of the pieces of data and source addresses of desired pieces of data, and when there is a match between one of the source addresses and one of the destination addresses, the CAM provides a signal to activate a corresponding one of the read ports.

2. The computer of claim 1, wherein there are additional bypass caches, each receiving pieces of data from a different one of the execution units, but each selectively supplying the pieces of data to each of the execution units.

3. The computer of claim 1, wherein one of the pieces of data can be written to the data registers, and the same or another piece of data is selectively read from the data registers, and made available to the source ports in one clock cycle.

4. The computer of claim 1, further comprising a register file that stores pieces of data and multiplexers that each multiplex between the register file and one of the groups of conductors, so that each source port receives either a piece of data from the register file or from one of the groups of conductors.

5. The computer of claim 1, further comprising a write pointer unit that designates which of the data registers one of the pieces of data is written into a particular time.

6. The computer of claim 5, wherein the write pointer unit is a rotating write pointer unit.

7. The computer of claim 1, wherein the CAM includes address registers that hold the destination addresses and further comprising a rotating write pointer unit that designates which of the address registers and data registers is written into at a given time.

8. The computer of claim 1, further comprising a scheduler unit that supplies the source addresses and the destination addresses to the CAM.

9. The computer of claim 1, wherein there are N ones of the source ports, N ones of the source addresses, and N ones of the read ports for each of the data registers.

10. The computer of claim 1, wherein there are N/2 execution units, N source ports, and N/2−1 additional CAMs each like the CAM, and N/2−1 additional bypass caches each like the bypass cache.

11. A computer comprising:
    execution units including source ports;
    groups of conductors, each group being connected to one of the source ports; and
    a bypass network including:
       multiported bypass caches, each including data registers to store pieces of data from only one of the execution units, and read ports each when activated providing the piece of data in a corresponding one of the data registers to a corresponding one of the groups of conductors; and
       content addressable memory arrays (CAMs), each having address registers to store destination addresses of the pieces of data stored in a corresponding one of the bypass caches, and including comparators having outputs each connected to one of the read ports of the corresponding one of the bypass caches and when there is a match between one of the destination addresses and a source address, a signal at a corresponding one of the outputs is asserted which activates a corresponding one of the read ports.

12. The computer of claim 11, wherein one of the pieces of data can be written to the data registers, and the same or another piece of data is selectively read from the data registers, and made available to the source ports in one clock cycle.

13. The computer of claim 11, further comprising a register file that stores pieces of data and multiplexers that each multiplex between the register file and one of the groups of conductors, so that each source port receives either a piece of data from the register file or from one of the groups of conductors.

14. The computer of claim 11, further comprising a write pointer unit that designates which of the data registers one of the pieces of data is written into a particular time.

15. The computer of claim 14, wherein the write pointer unit is a rotating write pointer unit.

16. The computer of claim 11, wherein the computer is a microprocessor.

17. The computer of claim 11, wherein there are N ones of the source ports, N ones of the source addresses, and N ones of the read ports for each of the data registers.

18. The computer of claim 11, wherein there is are N/2 execution units, N source ports, and N/2-1 additional CAMs each like the CAM, and N/2-1 additional bypass caches each like the bypass cache.

19. A computer comprising:

an execution unit including source ports;

a register file for storing pieces of data;

groups of conductors, each group being connected to one of the source ports;

a bypass network including:

a multiported bypass cache including data registers to store pieces of data from the execution unit, and read ports each when activated providing the piece of data in a corresponding one of the data registers to a corresponding one of the groups of conductors; and a content addressable memory array (CAM) receiving destination addresses of the pieces of data and source addresses of desired pieces of data, and when there is a match between one of the source addresses and one of the destination addresses, the CAM provides a signal to activate a corresponding one of the read ports; and multiplexers to choose between pieces of data from the register file and pieces of data from the bypass cache.

20. A computer comprising:

execution units including source ports;

groups of conductors, each group being connected to one of the source ports; and a bypass network including:

a multiported bypass cache including data registers to store pieces of data from one of the execution units, and read ports each when activated providing the piece of data in a corresponding one of the data registers to a corresponding one of the groups of conductors; and a content addressable memory array (CAM) receiving destination addresses of the pieces of data and source addresses of desired pieces of data, and when there is a match between one of the source addresses and one of the destination addresses, the CAM provides a signal to activate a corresponding one of the read ports, wherein one of the pieces of data can be written to the data registers, and the same or another piece of data is selectively read from the data registers, and made available to the source ports in one clock cycle.

21. A computer comprising:

execution units including source ports;

groups of conductors, each group being connected to one of the source ports; and a bypass network including:

multiported bypass caches each including data registers to store pieces of data from one of the execution units, and read ports each when activated providing the piece of data in a corresponding one of the data registers to a corresponding one of the groups of conductors; and content addressable memory array (CAMs) each receiving destination addresses of the pieces of data and source addresses of desired pieces of data, and when there is a match between one of the source addresses and one of the destination addresses, the one of the CAMs providing a signal to activate a corresponding one of the read ports.

* * * * *

UNITED STATES PATENT AND TRADEMARK OFFICE
CERTIFICATE OF CORRECTION

PATENT NO.    : 6,000,016
DATED         : December 7, 1999
INVENTOR(S)   : Curtis et al.

It is certified that error appears in the above-identified patent and that said Letters Patent is hereby corrected as shown below:

Column 2,
Line 51, delete "an", insert -- and --.

Signed and Sealed this

Tenth Day of June, 2003

JAMES E. ROGAN
*Director of the United States Patent and Trademark Office*